US012626325B2

(12) United States Patent
Ha et al.

(10) Patent No.: US 12,626,325 B2
(45) Date of Patent: May 12, 2026

(54) METHOD AND APPARATUS WITH IMAGE PROCESSING

(71) Applicant: SAMSUNG ELECTRONICS CO., LTD., Suwon-si (KR)

(72) Inventors: Inwoo Ha, Suwon-si (KR); Nahyup Kang, Suwon-si (KR); Hyeonseung Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 161 days.

(21) Appl. No.: 18/528,979

(22) Filed: Dec. 5, 2023

(65) Prior Publication Data

US 2024/0212089 A1     Jun. 27, 2024

(30) Foreign Application Priority Data

Dec. 23, 2022     (KR) ........................ 10-2022-0183446

(51) Int. Cl.
  *G06T 3/18*       (2024.01)
  *G06T 3/4053*     (2024.01)
      (Continued)

(52) U.S. Cl.
  CPC .............. *G06T 3/18* (2024.01); *G06T 3/4053* (2013.01); *G06T 5/70* (2024.01); *G06T 15/06* (2013.01); *G06T 2207/20084* (2013.01)

(58) Field of Classification Search
  CPC ........... G06T 3/18; G06T 3/4053; G06T 5/70; G06T 15/06; G06T 2207/20084; G06T 15/205; G06T 5/80; G06T 15/10
  See application file for complete search history.

(56) References Cited

U.S. PATENT DOCUMENTS 8,237,711 B2      8/2012  McCombe et al.
10,789,675 B2 *   9/2020  Pohl ...................... G06T 3/4007
          (Continued)

FOREIGN PATENT DOCUMENTS

KR        10-2164541 B1    10/2020
WO     WO 2021/003405 A1    1/2021

OTHER PUBLICATIONS

Thomas, Manu Mathew, et al. "Temporaily stable real-time joint neural denoising and supersampling." Proceedings of the ACM on Computer Graphics and interactive Techniques vol. 5, No. 3 (Jul. 27, 2022):pp. 1-22. (Year: 2022).*
          (Continued)

*Primary Examiner* — Michael Le
(74) *Attorney, Agent, or Firm* — Sughrue Mion, PLLC

(57)          ABSTRACT

A method and apparatus with image processing is provided. The processor-implemented method includes generating a warped image frame by warping a first reconstructed image frame of a first time point based on first change data corresponding to a change between first rendered image frame of the first time point and second rendered image frame of a second time point that is different from the first time point; generating, using a neural reconstruction model based on the second rendered image frame and the warped image frame, a confidence map representing a second reconstructed image frame of the second time point and confidence scores of pixels of the second reconstructed image frame; and generating a third rendered image frame of a third time point, different from the first and second time points, by ray tracing for each of plural pixels of the third rendered image frame based on the confidence map.

12 Claims, 11 Drawing Sheets

(51) Int. Cl.
  _G06T 5/70_   (2024.01)
  _G06T 15/06_   (2011.01)

(56)   References Cited

U.S. PATENT DOCUMENTS

|  |  |  |  |
|---|---|---|---|
| 11,216,916 B1 | 1/2022 | Kozlowski et al. |  |
| 2020/0211157 A1* | 7/2020 | Pohl | G06T 7/20 |
| 2021/0295583 A1* | 9/2021 | Vaidyanathan | G06T 15/005 |
| 2021/0344944 A1 | 11/2021 | Andersson et al. |  |
| 2022/0392116 A1* | 12/2022 | Vembar | G06T 15/06 |

OTHER PUBLICATIONS

Thomas, Manu Mathew, et al. "Temporally stable real-time joint neural denoising and supersampling." _Proceedings of the ACM on Computer Graphics and Interactive Techniques_ vol. 5, No. 3 (Jul. 27, 2022): pp. 1-22.
Extended European search report issued on May 31, 2024, in counterpart European Patent Application No. 23219449.8 (8 pages).

\* cited by examiner

700

800

METHOD AND APPARATUS WITH IMAGE PROCESSING

CROSS-REFERENCE TO RELATED APPLICATIONS

This application claims the benefit under 35 USC § 119(a) of Korean Patent Application No. 10-2022-0183446, filed on Dec. 23, 2022, in the Korean Intellectual Property Office, the entire disclosure of which is incorporated herein by reference for all purposes.

BACKGROUND

1. Field

The following description relates to a method and apparatus with image processing.

2. Description of Related Art

Three-dimensional (3D) rendering performs rendering on a 3D scene into a two-dimensional (2D) image in image processing. A neural network may be trained and used in such image processing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes generating a warped image frame by warping a first reconstructed image frame of a first time point based on first change data corresponding to a change between first rendered image frame of the first time point and second rendered image frame of a second time point that is different from the first time point; generating, using a neural reconstruction model based on the second rendered image frame and the warped image frame, a confidence map representing a second reconstructed image frame of the second time point and confidence scores of pixels of the second reconstructed image frame; and generating a third rendered image frame of a third time point, different from the first and second time points, by ray tracing for each of plural pixels of the third rendered image frame based on the confidence map.

The generating of the third rendered image frame may include generating a warped map by warping the confidence map based on second change data representing a change between the second rendered image frame and the third rendered image frame; generating a sampling map designating a respective sampling number for each pixel of the third rendered image frame using a neural sampling map generation model based on the warped map; and rendering the third rendered image frame by performing the ray tracing to generate each pixel of the third rendered image frame according to the respective sampling number of the sampling map.

The warped map may include a respective confidence score for each pixel of the third rendered image frame.

The neural sampling map generation model may designate the respective sampling number for each pixel of the third rendered image frame based on the respective confidence score of the warped map.

The warped map may include a first confidence score corresponding to a first pixel of the third rendering image and a second confidence score corresponding to a second pixel of the third rendering image, and wherein the use of the neural sample map generation model may include, with the first confidence score being less than the second confidence score, the neural sampling map generation model allocating, to the first pixel, a first sampling number of the respective sample numbers that is greater than that of a second sampling number of the respective sampling numbers, allocated by the neural sample map generation model to the second pixel.

In an example, a maximum value or an average value of the respective sampling numbers may be limited by a preset threshold.

The generating of the sampling map using the neural sample map generation model may include inputting, to the neural sampling map generation model, additional information corresponding to the third rendered image frame comprising at least a part of a depth map, a normal map, and an albedo map.

The first change data may include a motion vector of a corresponding pixel between the first rendered image frame and the second rendered image frame.

The neural reconstruction model may include a neural auto encoder comprising a neural encoder and a neural decoder.

The neural reconstruction model may determine an output image frame having fewer artifacts and a higher resolution than an image frame, input to the neural reconstruction model, by reconstructing the image frame based on denoising and super sampling with respect to the input image frame.

The first reconstructed image frame may be generated by using the neural reconstruction model based on the first rendered image frame.

In an example, a non-transitory computer-readable storage medium storing instructions that, when executed by a processor, cause the processor to perform the method.

In another general aspect, a computing apparatus includes a processor configured to execute instructions; and a memory storing the instructions, wherein the execution of the instructions by the processor configures the processor to generate a warped image frame by warping a first reconstructed image frame of a first time point based on first change data representing a change between first rendered image frame of the first time point and second rendered image frame of a second time point that is different from the first time point; generate, using a neural reconstruction model based on the second rendered image frame and the warped image frame, a confidence map representing a second reconstructed image frame of the second time point and confidence scores of pixels of the second reconstructed image frame; and generate a third rendered image frame of a third time point, different from the first and second time points, by ray tracing for each of plural pixels of the third rendered image frame based on the confidence map.

For the generating of the third rendered image frame, the processor may be configured to generate a warped map by warping the confidence map based on second change data representing a change between the second rendered image frame and the third rendered image frame; generate, using a neural sampling map generation model based on the warped map, a sampling map designating a respective sampling number for each pixel of the third rendered image frame; and render the third rendered image frame by performing ray tracing for each pixel of the third rendered image frame according to the respective sampling number of the sampling map.

The warped map may include a respective confidence score corresponding to each pixel of the third rendered image frame, and the neural sampling map generation model may designate the respective sampling number for each pixel of the third rendered image frame based on the respective confidence score of the warped map.

The warped map may include a first confidence score corresponding to a first pixel of the third rendering image and a second confidence score corresponding to a second pixel of the third rendering image, and the use of the neural sample map generation model may include, with the first confidence score being less than the second confidence score, the neural sampling map generation model allocating, to the first pixel, a first sampling number of the respective sample numbers that is greater than that of a second sampling number of the respective sampling numbers, allocated by the neural sample map generation model to the second pixel.

In the apparatus, a maximum value or an average value of the respective sampling numbers may be limited by a preset threshold.

In another general aspect, an electronic device includes a processor configured to generate a warped image frame by warping a first reconstructed image frame of a first time point based on first change data representing a change between first rendered image frame of the first time point and second rendered image frame of a second time point that is different from the first time point; generate, using a neural reconstruction model based on the second rendered image frame and the warped image frame, a confidence map representing a second reconstructed image frame of the second time point and confidence scores of pixels of the second reconstructed image frame; generate a warped map by warping the confidence map based on second change data corresponding to a change between the second rendered image frame and a third rendered image frame of a third time point that is different from the first and second time points; generate, using a neural sampling map generation model based on the warped map, a sampling map designating a respective sampling number for each of plural pixels of the third rendered image frame; and render the third rendered image frame by performing respective one or more ray tracings on each of the plural pixels of the third rendered image frame according to the respective sampling numbers of the sampling map.

The warped map may include a respective confidence score corresponding to each of the plural pixels of the third rendered image frame; and the neural sampling map generation model may designate the respective sampling numbers based on the respective confidence score of the warped map.

The electronic device may further include a display configured to display an output image according to the first reconstructed image frame and the second reconstructed image frame, wherein the warped map may include a first confidence score corresponding to a first pixel of the third rendering image and a second confidence score corresponding to a second pixel of the third rendering image, and wherein the use of the neural sample map generation model may include, with the first confidence score being less than the second confidence score, the neural sampling map generation model allocating, to the first pixel, a first sampling number of the respective sample numbers that is greater than that of a second sampling number of the respective sampling numbers, allocated by the neural sample map generation model to the second pixel.

Other features and aspects will be apparent from the following detailed description, the drawings, and the claims.

Figure 1:
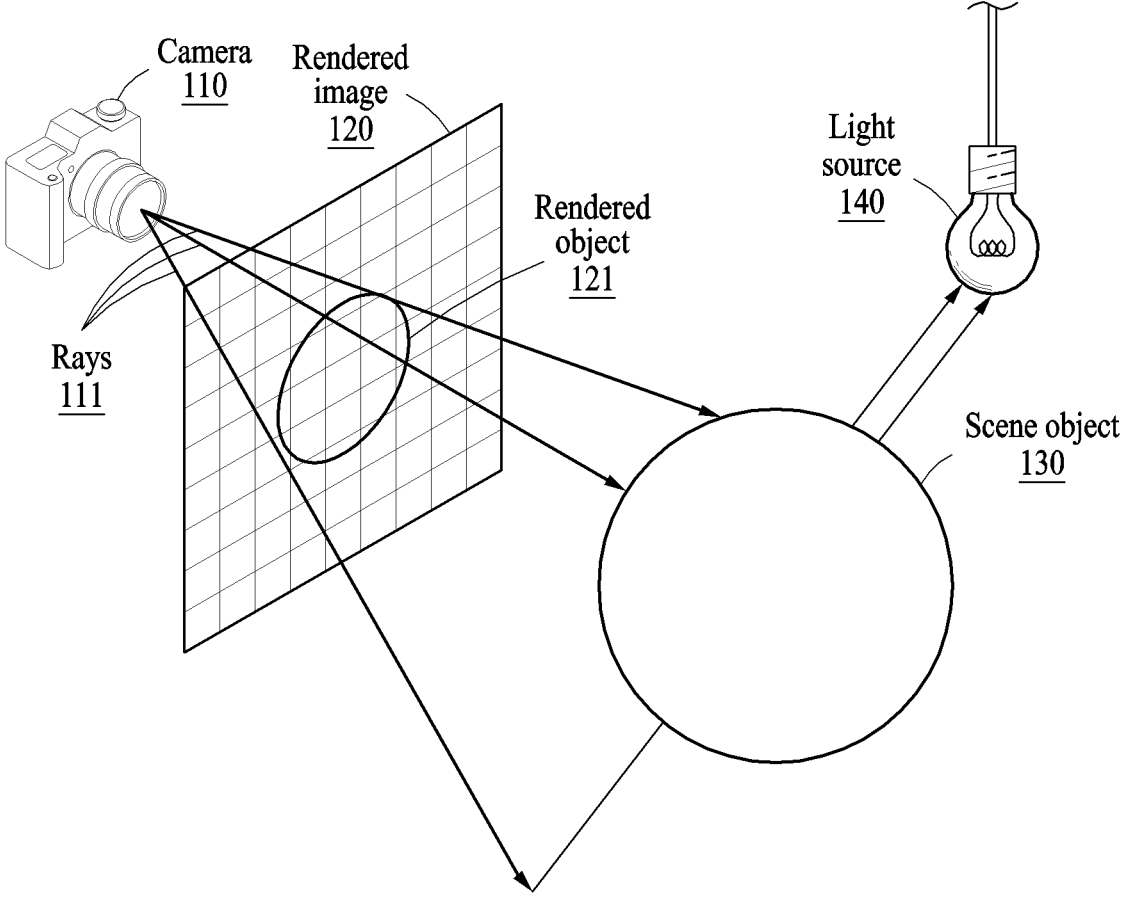
FIG. 1 illustrates an example existing rendering process based on ray tracing.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. It is to be understood that if a component (e.g., a first component) is referred to, with or without the term "operatively" or "communicatively," as "coupled with," "coupled to," "connected with," or "connected to" another component (e.g., a second component), it means that the component may be coupled with the other component directly (e.g., by wire), wirelessly, or via a third component.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

In one or more embodiments, for image processing, a neural network may be trained, e.g., to map input data and output data that are in a nonlinear relationship to each other, based on deep learning and may then be used to perform inference operation(s) for a desired purpose. The trained ability to perform such mapping may be referred to as a learning ability of the neural network.

FIG. 1 illustrates an example existing rendering process based on ray tracing. Referring to FIG. 1, an existing image processing apparatus may perform a typical rendering process on a scene object 130 in a three-dimensional (3D) space based on a view point of a camera 110. A rendered image 120 may correspond to a rendered result of such a rendering process. 3D rendering may be one field of computer graphics that performs the rendering process on a 3D scene, such as the scene object 130, into a two-dimensional (2D) image, such as the rendered image 120. According to the typical rendering process, the scene object 130 may be projected as a rendered object 121 on the rendered image 120. The existing image processing apparatus may express the effect of light related to the rendered object 121 based on ray tracing using light rays 111. For example, the effect of light may include reflection of light by the rendered object 121, reflection of light between the rendered object 121 and another object, and shadow by the rendered object 121.

A typical ray tracing is a rendering technique that traces back a path of light by using light rays 111 directed to the scene object 130 from the view point. For example, when a light source 140 affecting the scene object 130 is detected through the light rays 111, the effect of the light source 140 on the scene object 130 may be calculated to express the rendered object 121 of the rendered image 120. A sense of reality of the rendered object 121 may improve according to the diversity of the light rays 111. When the number of light rays 111 is insufficient, artifacts may occur in the rendered image 120. However, as the number of rays 111 increases, the amount of computations required for the typical ray tracing may also increase.

According to one or more embodiments, a computing apparatus may perform a desired or an optimal rendering process based on a given number of light rays 111, using a first machine learning model, e.g., neural sampling map generation model, and a second machine learning model, e.g., neural reconstruction model. The neural reconstruction model may be configured to remove an artifact from an input rendered image by performing reconstruction, such as denoise, on the input rendered image. The neural sampling map generation model may be configured to generate a sampling map by using a warped result of output data of the neural reconstruction model. A processor-implemented method with image processing using the neural sampling map generation model and the neural reconstruction model will also be described in detail below.

Figure 2:
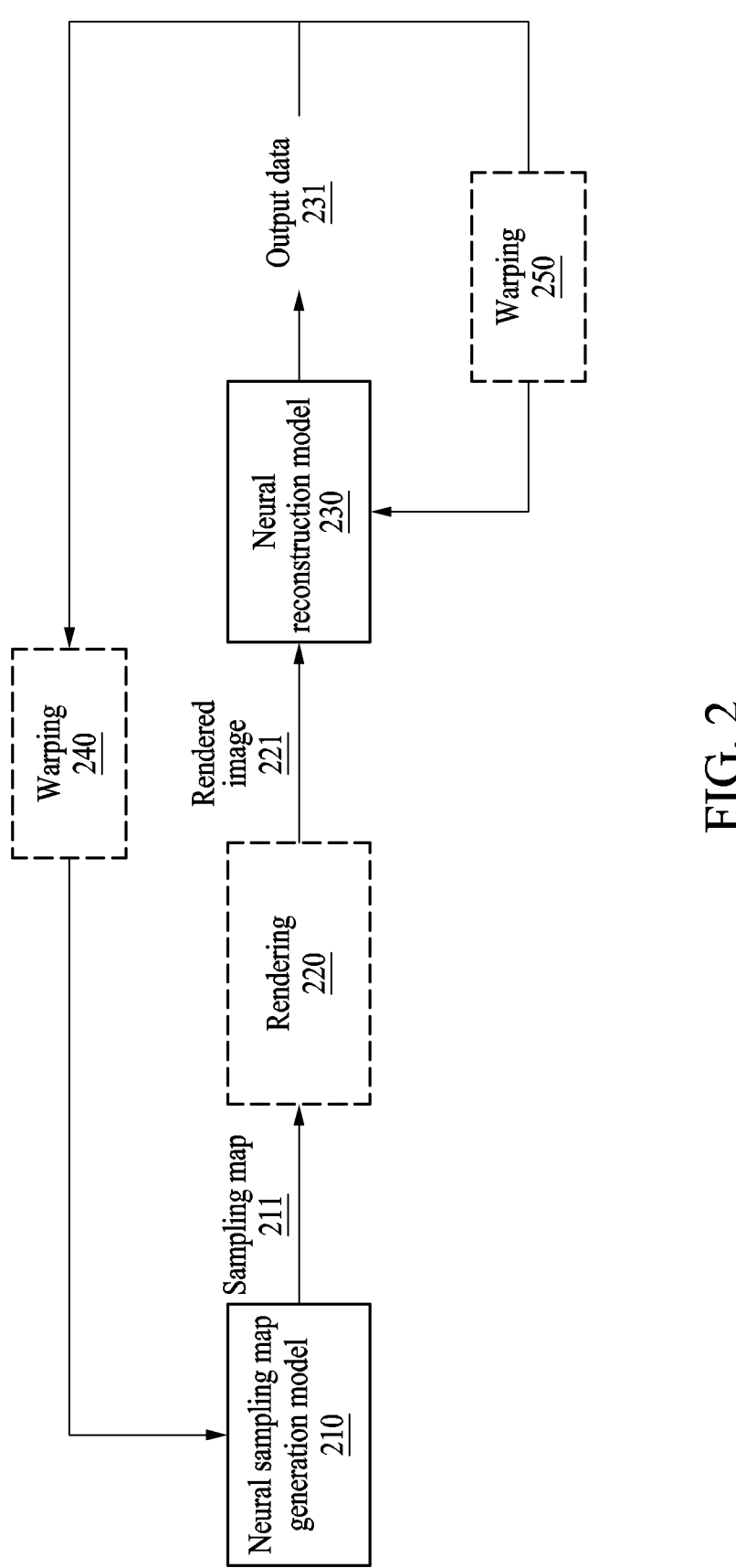
FIG. 2 illustrates an example image processing process using a neural sampling map generation model and a neural reconstruction model according to one or more embodiments.

FIG. 2 illustrates an example method with image processing using a neural sampling map generation model and a neural reconstruction model according to one or more embodiments. Referring to FIG. 2, the example method may perform the image processing through a neural sampling map generation model 210 for generating a sampling map 211 based on a warped result from a performed warping 240 and through a neural reconstruction model 230 for generating output data 231 based on a rendered image 221 and a warped result from a performed warping 250. The rendered image 221 may be generated through rendering 220 based on the sampling map 211 and provided to the neural reconstruction model 230, as a non-limiting example.

The output data 231 may include a reconstructed image and a confidence map that may be generated based on the rendered image 221 through a neural reconstruction process performed by the neural reconstruction model 230. The neural reconstruction process may include denoise and/or super sampling, and thus, the reconstructed image may have fewer artifacts and/or a higher resolution than the rendered image 221. The reconstructed image may be provided to a user through various display devices of different embodiments.

The confidence map may represent confidence scores of pixels of the reconstructed image. A pixel of the reconstructed image may include a high confidence score and refer to the pixel reconstructed close to ground truth (GT). The confidence map may include confidence scores corresponding to a resolution of the confidence map. The resolution of the confidence map may be the same as or different from a resolution of the reconstructed image. When the confidence map has a lower resolution than the reconstructed image, one confidence score of the confidence map may correspond to a certain area including a plurality of pixels of the reconstructed image, as a non-limiting example.

The rendered image 221 and the reconstructed image may each include a plurality of image frames. The plurality of respective image frames of the rendered image 221 and the reconstructed image may be classified by using a time point t. For example, the rendered image 221 may include a rendered image frame of a first time point, a rendered image frame of a second time point, and a rendered image frame of a third time point. The reconstructed image may include a corresponding reconstructed image frame of the first time point, a corresponding reconstructed image frame of the second time point, and a corresponding reconstructed image frame of the third time point.

The warping 240 and the warping 250 may be each performed based on change data. For example, either the warping 240 or the warping 250 may include respective mapping of target data of a time point t−1 based on change data between an image frame of the time point t−1 and an image frame of the time point t. The change data may include a motion vector of a corresponding pixel between the image frame of the time point t−1 and the image frame of the time point t. In an example, a warped result of either the warping 240 or the warping 250 may be used as pseudo target data of the time point t. The pseudo target data may not match the target data but may have the ability to cover a part of the role of the target data as a non-limiting example.

In an example, the warping 250 may include warping a reconstructed image frame of a first time point based on first change data representing a change between the rendered image frame of the first time point and a rendered image frame of a second time point. A warped result of the warping 250 may be referred to as a warped image frame. The neural reconstruction model 230 may generate a confidence map indicating the reconstructed image frame of the second time point and confidence scores of pixels of the reconstructed image frame of the second time point, based on the rendered image frame of the second time point and the warped image frame.

In an example, the warping 240 may include warping the confidence map based on second change data representing a change between the rendered image frame of the second time point and a rendered image frame of a third time point. A warped result of the warping 240 may be referred to as a warped map. The neural sampling map generation model 210 may generate the sampling map 211 based on the warped map. The sampling map 211 may designate a sampling number for each pixel of the rendered image frame of the third time point. The sampling map 211 may have the same resolution as the rendered image 221 as a non-limiting example.

The rendering 220 may perform a rendering operation/process based on the sampling map 211. In an example, the rendering 220 may perform ray tracing for each pixel of the rendered image frame of the third time point according to the sampling number of the sampling map 211. The rendering 220 may generate the rendered image frame of the third time point. The rendering 220 may correspond to a rendering pipeline including the ray tracing as a non-limiting example.

Then, an operation based on the rendered image frame of the third time point may be continuously performed. For example, the warping 250 may include warping the reconstructed image frame of the second time point, to generate a warped image frame, based on the second change data representing the change between the rendered image frame of the second time point and the rendered image frame of the third time point. The neural reconstruction model 230 may generate the confidence map indicating the reconstructed image frame of the third time point and confidence scores of pixels of the reconstructed image frame of the third time point, based on the rendered image frame of the third time point and the warped image frame.

The neural sampling map generation model 210 and the neural reconstruction model 230 may each include a neural network, as a non-limiting example. The neural network may include a deep neural network (DNN) including a plurality of layers. The DNN may include any one or any combination of a fully connected network (FCN), a convolutional neural network (CNN), and a recurrent neural network (RNN). For example, at least a portion of the layers included in the neural network may correspond to a CNN, and another portion of the layers may correspond to an FCN. The CNN may be referred to as convolutional layers, and the FCN may be referred to as fully connected layers. As a non-limiting example, the neural reconstruction model 230 may be configured with a neural auto encoder including a neural encoder and a neural decoder.

The neural network may be trained based on deep learning and then perform inference operations suitable for a training purpose by mapping input data and output data that are in a nonlinear relationship to each other. Deep learning is a machine learning technique for solving an issue, such as image or speech recognition from a big data set. Deep learning may be understood as a process of optimizing a solution to an issue to find a point at which energy is minimized while training a neural network based on prepared training data. Through supervised or unsupervised learning of deep learning, a structure of the neural network or a weight corresponding to a model may be obtained, and the input data and the output data may be mapped to each other through the weight. When a width and a depth of the neural network are sufficiently large, the neural network may have a capacity sufficient to implement a predetermined function. The neural network may achieve an optimized performance when learning a sufficiently large amount of training data through an appropriate training process.

The neural network may be expressed as being trained in advance, where "in advance" means before the neural network "starts". That the neural network "starts" may indicate that the neural network is ready for an inference operation. For example, that the neural network "starts" may include the neural network being loaded into a memory, and/or the input data for the inference operation being provided to or input into the neural network after the neural network is loaded into the memory.

Figure 3A:
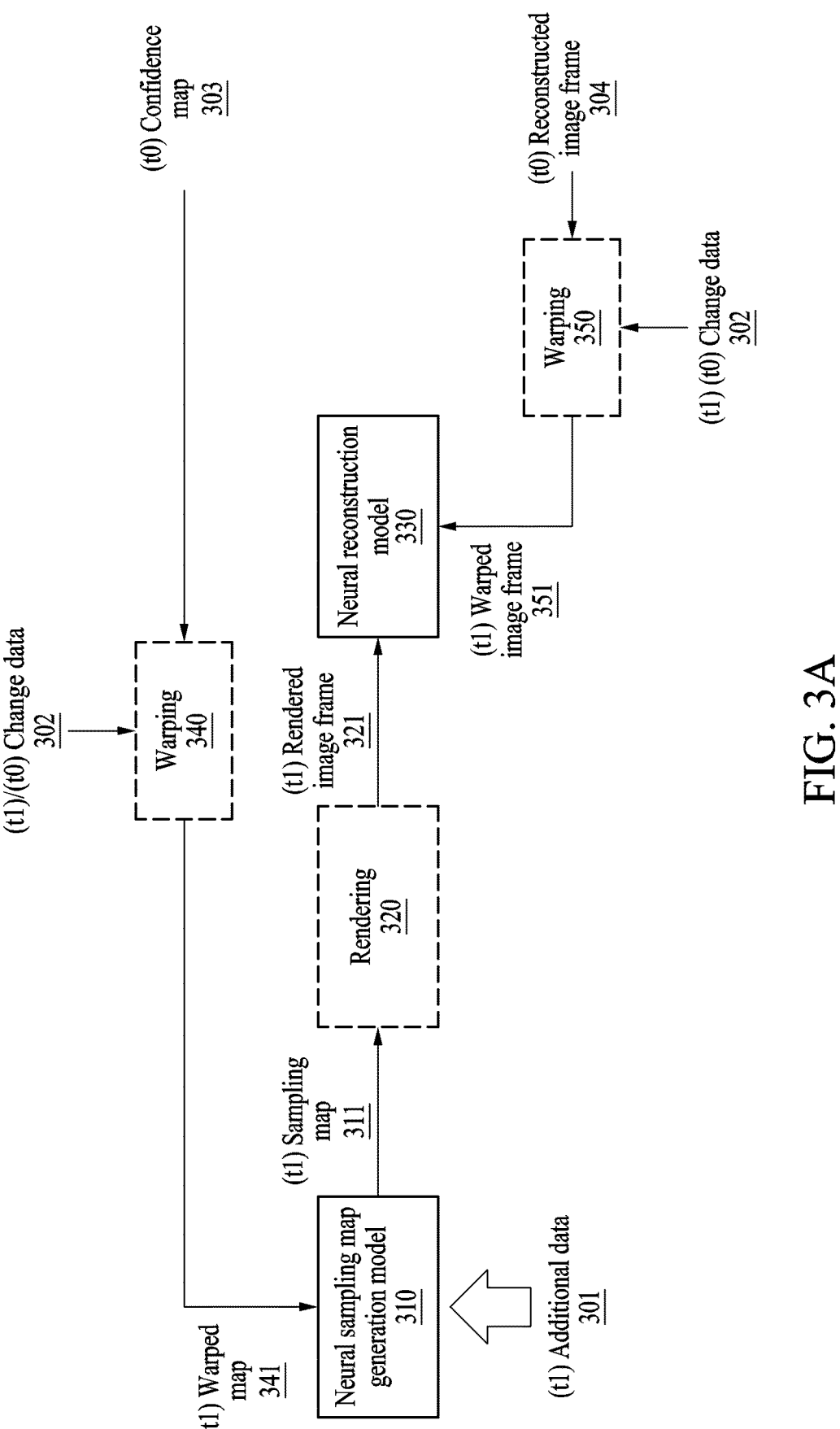
FIGS. 3A through 3D each illustrate an example operation of a neural sampling map generation model and a neural reconstruction model for each time point according to one or more embodiments.

FIGS. 3A through 3D each illustrate an example operation of a neural sampling map generation model and a neural reconstruction model for each time point according to one or more embodiments. Referring to FIG. 3A, warping 340 may be performed based on a confidence map 303 of a first time point t0 and change data 302, e.g., warping the confidence map 303 of the first time point t0 based on the change data 302, representing a change between a rendered image frame of the first time point t0 and a rendered image frame 321 of a second time point t1. A warped map 341 may be thus generated by the warping 340. The confidence map 303 may indicate confidence scores of pixels of a reconstructed image frame 304 of the first time point t0. The warped map 341 may correspond to a pseudo confidence map of the second time point t1.

A neural sampling map generation model 310 may generate a sampling map 311 of the second time point t1 based on the warped map 341. The neural sampling map generation model 310 may further use additional information 301 of the second time point t1 to generate the sampling map 311. For example, the additional information 301 may include at least a part of a depth map, a normal map, and an albedo map. Thus, rendering 320 may, based on the sampling map 311, be performed to generate the rendered image frame 321 of the second time point t1.

Figure 3B:
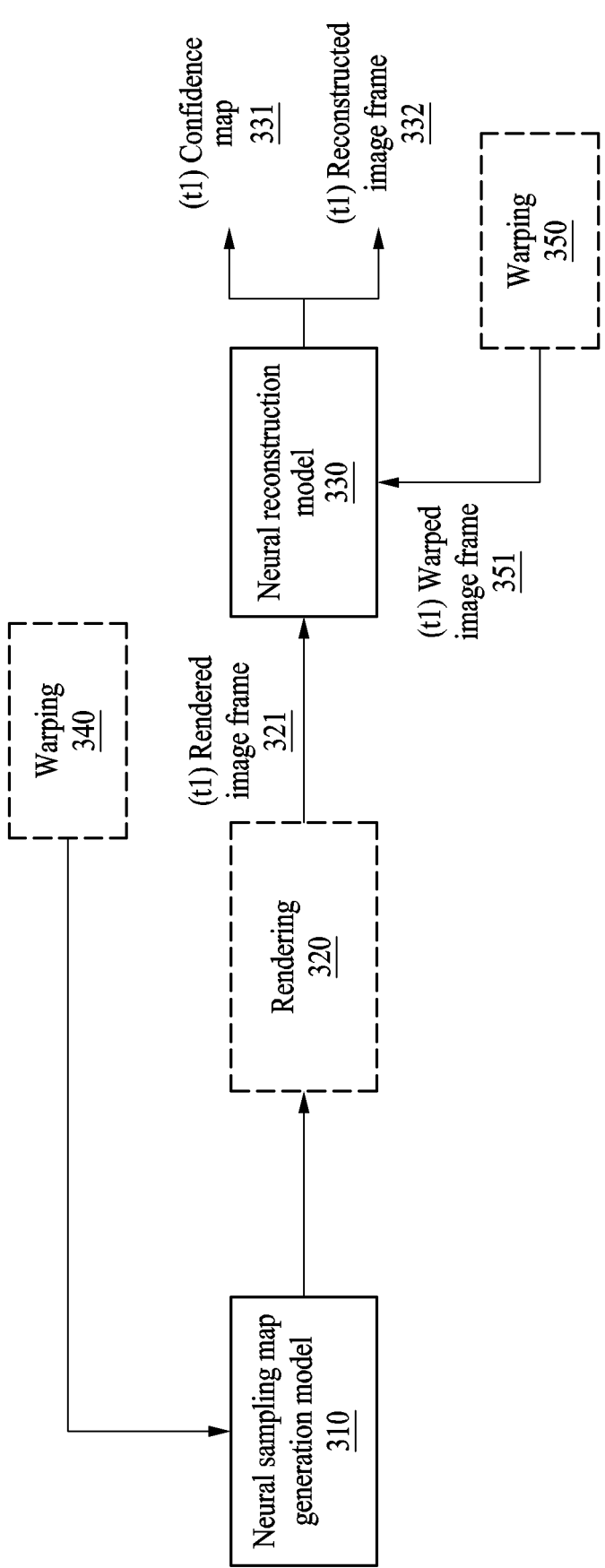

Warping 350 may be performed based on the reconstructed image frame 304 of the first time point t0 and change data 302, e.g., warping the reconstructed image from 304 of the first time point t0 based on the change data 302, representing the change between the rendered image frame of the first time point t0 and the rendered image frame 321 of the second time point t1. A warped image frame 351 of the second time point t1 may be thus generated by the warping 350. The rendered image frame 321 and the warped image frame 351 may be input to a neural reconstruction model 330. Referring to FIG. 3B, the neural reconstruction model 330 may be configured to generate a confidence map 331 of the second time point t1 and a reconstructed image frame 332 of the second time point t1, based on the rendered image frame 321 and the warped image frame 351.

Figure 3C:
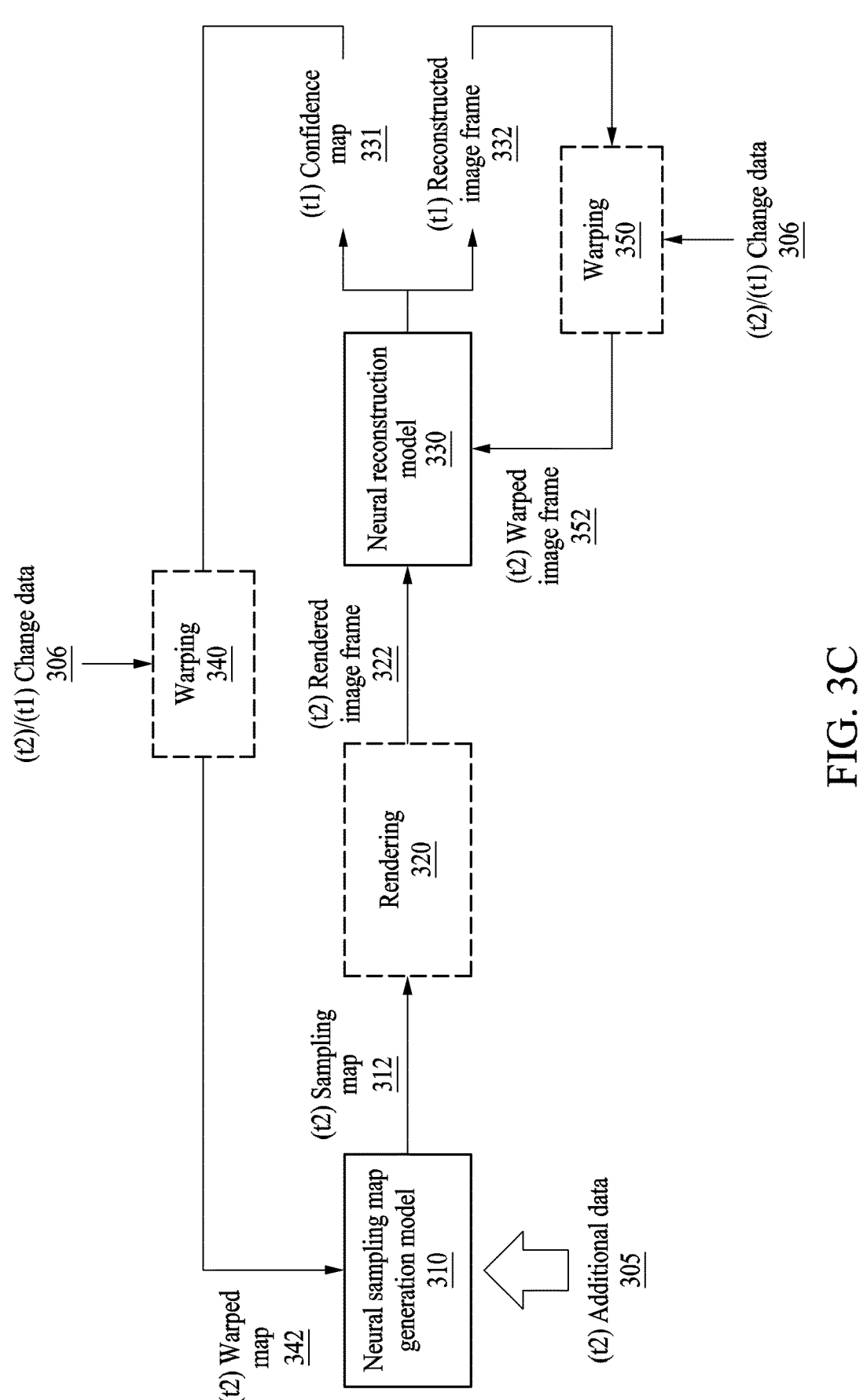

Referring to FIG. 3C, the warping 340 may be performed based on the confidence map 331 of the second time point t1 and change data 306 representing a change between the rendered image frame of the second time point t1 and a rendered image frame 322 of the third time point t2. A warped map 342 may be thus generated by the warping 340. The confidence map 331 may represent confidence scores of pixels of the reconstructed image frame 332 of the second time point t1. The warped map 342 may correspond to a pseudo confidence map of the third time point t2.

The neural sampling map generation model 310 may be configured to generate a sampling map 312 of the third time point t2 based on the warped map 342. The neural sampling map generation model 310 may further use additional information 305 of the third time point t2 to generate the sampling map 312. Thus, the rendering 320 may, based on the sampling map 312, generate the rendered image frame 322 of the third time point t2.

Figure 3D:
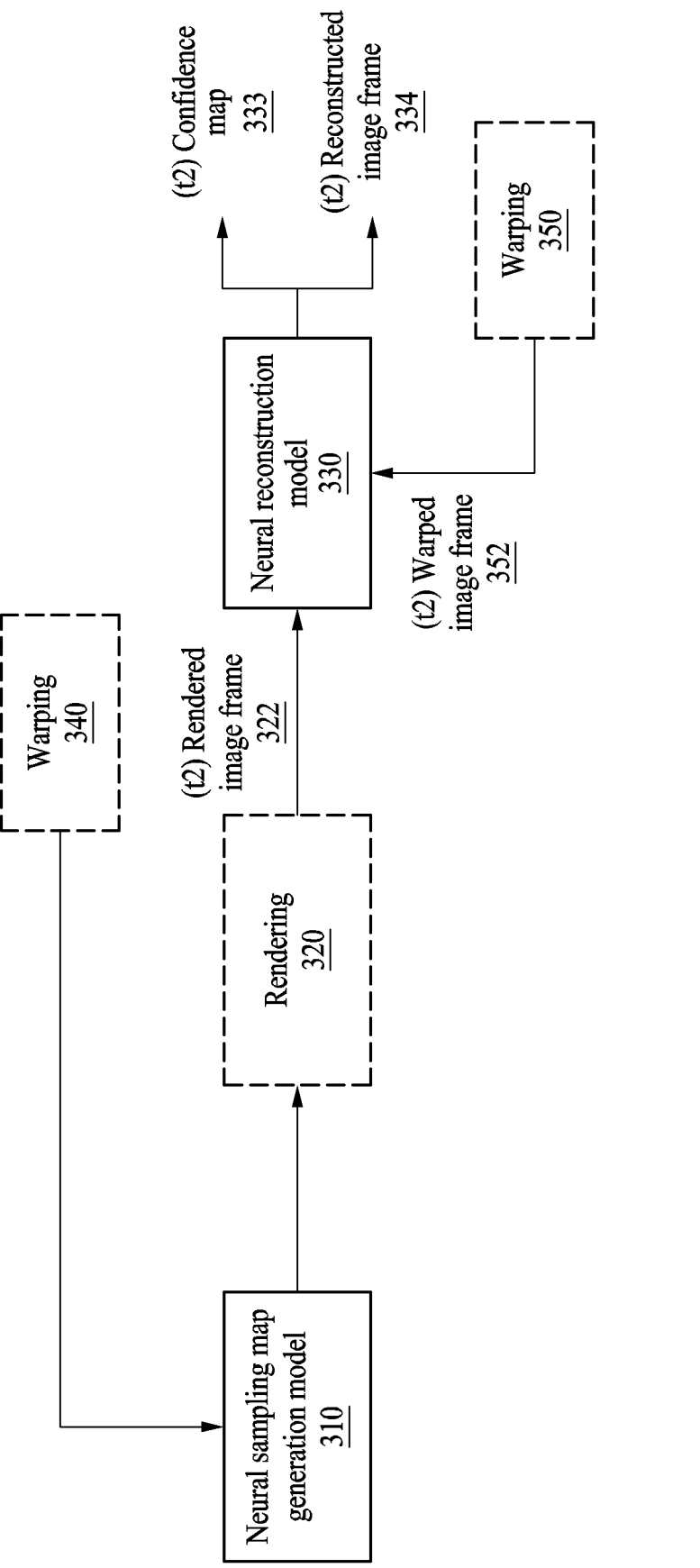

The warping 350 may be performed based on the reconstructed image frame 332 of the second time point t1 and the change data 306 representing a change between the rendered image frame of the second time point t1 and the rendered image frame 322 of the third time point t2. A warped image frame 352 of the third time point t2 may thus be generated by the warping 350. The rendered image frame 322 and the warped image frame 352 may be input to the neural reconstruction model 330. Referring to FIG. 3D, the neural reconstruction model 330 may be configured to generate a confidence map 333 of the third time point t2 and a reconstructed image frame 334 of the third time point t2, based on the rendered image frame 322 and the warped image frame 352.

Figure 4:
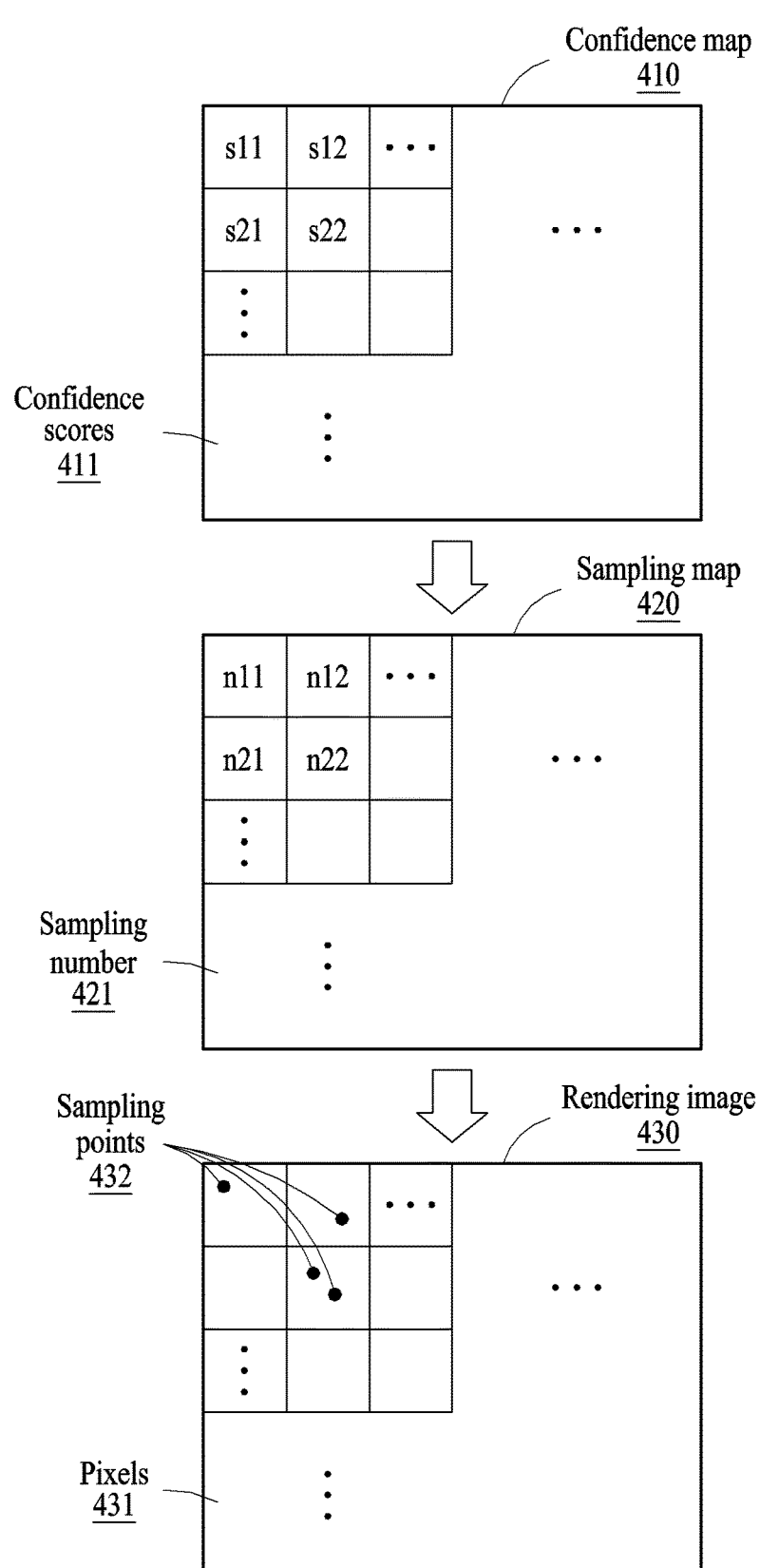
FIG. 4 illustrates examples of a confidence map, a sampling map, and a rendered image according to one or more embodiments.

FIG. 4 illustrates examples of a confidence map, a sampling map, and a rendered image according to one or more embodiments. Referring to FIG. 4, confidence scores 411 of a confidence map 410 may be used to determine a sampling number 421 of a sampling map 420 as a non-limiting example. A description of the confidence map 410 below may also be applied to a warped map that is a warped result of a warping of the confidence map 410. The confidence map 410 may have the same resolution as the sampling map 420 as a non-limiting example. Specifically, the resolution of the confidence map 410 and the resolution of the sampling map 420 may be i*j. In an example, the confidence scores 411 may be expressed as $s_{ij}$ and the sampling number 421 may be expressed as $n_{ij}$.

The value of $n_{ij}$ may be determined according to the value of $s_{ij}$. In an example, the value of $s_{ij}$ may increase as the value of $n_{ij}$ decreases. For example, when the value of $s_{11}$ is less than the value of $s_{12}$, a neural sampling map generation model may assign, to $n_{11}$, a value that is greater than $s_{12}$. A confidence score may indicate a reconstruction level of a pixel represented by the confidence score. For example, a determined high confidence score of a pixel may refer to a corresponding pixel reconstructed close to GT, as a non-limiting example. A determined low confidence score of a pixel may refer to a corresponding pixel needed to increase its reconstruction level by increasing the number of rays for this corresponding pixel when performing ray tracing to generate the rendered image 430, as a non-limiting example.

The sampling number 421 of the sampling map 420 may be used to determine sampling points 432 of pixels 431 of a rendered image 430. The sampling map 420 may have the same resolution as the rendered image 430. For example, the resolution of the rendered image 430 may be i*j. In this case, the pixels 431 of the rendered image 430 may be expressed as $p_{ij}$. Sampling may be performed on $p_{ij}$ according to the value of $n_{ij}$, and the sampling points 432 may be determined according to the sampling. For example, the rendered image 430 of FIG. 4 may correspond to an example in which $n_{11}$ is 1, $n_{12}$ is 1, $n_{21}$ is 0, and $n_{22}$ is 2. Positions of the sampling points 432 of pij may be randomly determined as a non-limiting example.

In an example, the maximum value or average value of the sampling numbers 421 according to the sampling map 420 may be limited by a preset threshold. There may be respective limitations on the maximum value of the sum of the sampling numbers 421 of the pixels 431, the maximum value of each of the sampling numbers 421 of the pixels 431, or the average value of the sampling number 421 of the pixels 431. As a non-limiting example, the greater the number of rays, the more the amount of computations required for ray tracing. The amount of computations may be adjusted by limiting the sampling number 421 corresponding to the number of rays.

In an example, a neural sampling map generation model (e.g., the neural sampling map generation model 310 in FIG. 3) may be trained under such limitations. When there are no such limitations, the neural sampling map generation model may be trained in a direction of increasing the sampling numbers 421 of all of the pixels 431. Where there are such limitations, the neural sampling map generation model may determine the sampling number 421 such that fewer sampling operations may be performed for rendering a pixel of the rendered image 430 when the corresponding pixel score in the confidence map 410 has a high confidence score and more sampling operations may be performed for rendering another pixel of the rendered image 430 when the corresponding pixel score in the confidence map 410 has a low confidence score in the confidence map 410. For example, when there is a pixel to be rendered that has an extremely high confidence score in the confidence map 410, the neural sampling map generation model may assign the sampling number 421 of 0, such as $n_{21}$, to the pixel. In view of the limitations on the maximum value of the sum of the sampling numbers 421 or the average value of the sampling numbers 421, when a sampling number of 0 is allocated to a certain pixel, the sampling numbers that may be allocated to the remaining pixels may increase. Such balancing may optimize the sampling numbers 421 in a situation where the sampling numbers 421 are limited.

Figure 5:
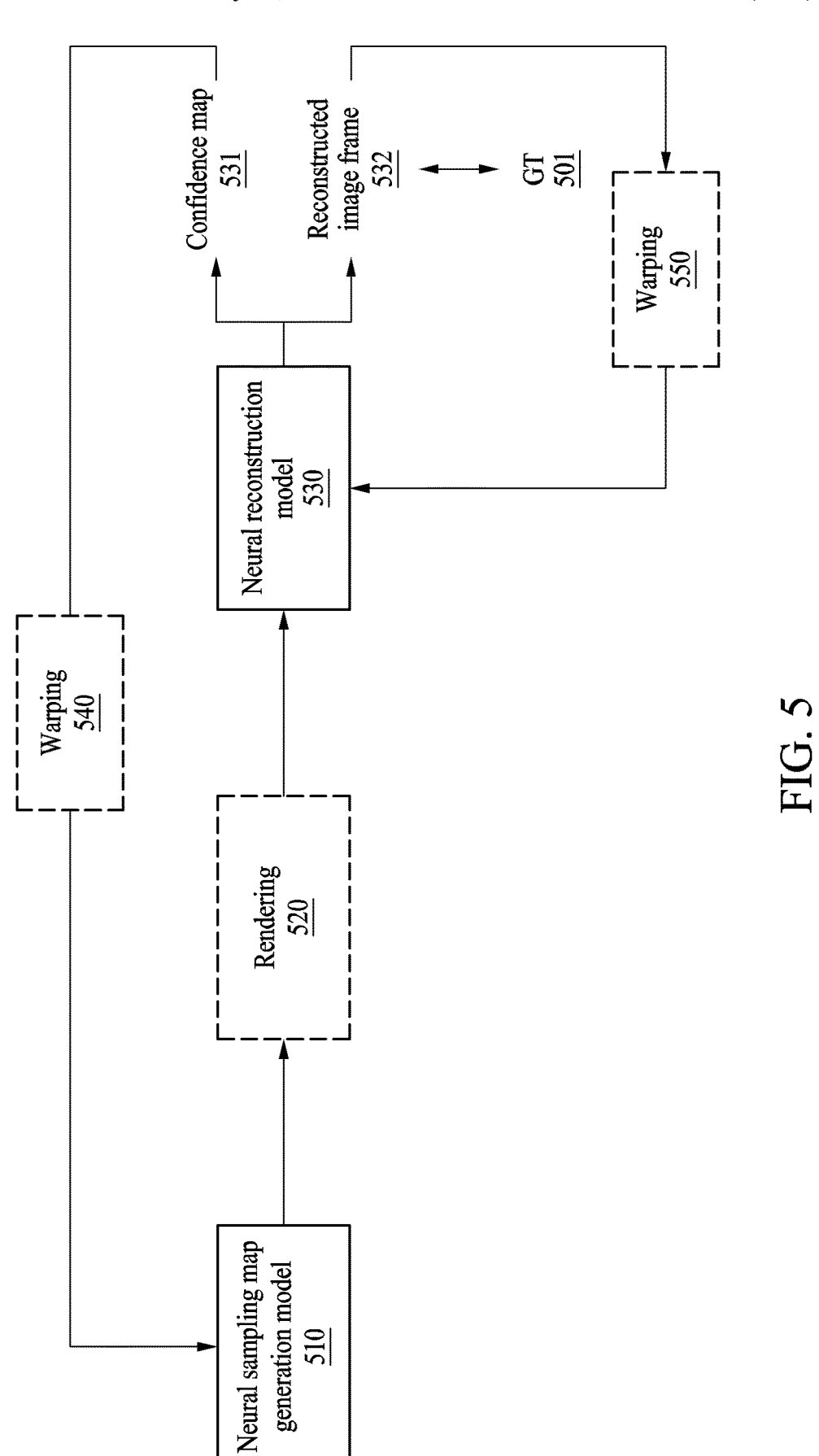
FIG. 5 illustrates an example training process of a neural sampling map generation model and a neural reconstruction model according to one or more embodiments.

FIG. 5 illustrates an example training process of a neural sampling map generation model and a neural reconstruction model according to one or more embodiments. Referring to FIG. 5, an in-training neural sampling map generation model 510 may be configured to generate a sampling map based on a result of warping 540, and rendering 520 may generate a rendered result based on the training sampling map. A neural reconstruction model 530 may be configured to generate a training confidence map 531 and a training reconstructed image frame 532 based on the rendered result of the rendering 520 and a warped result of warping 550. The in-training neural sampling map generation model 510 and the in-training neural reconstruction model 530 may be trained in a direction to reduce a difference between the training reconstructed image frame 532 and ground truth (GT) 501. In an example, the difference between the training reconstructed image frame 532 and the GT 501 may be used as a loss for adjusting the parameters of the in-training neural sampling map generation model 510 and/or the parameters of the in-training neural reconstruction model 530. As the output of the in-training neural reconstruction model 530 provides the in-training confidence map 531 in addition to the training reconstructed image frame 532, both the in-training neural sampling map generation model 510 and the training reconstructed image frame 532 may improve their respective performances in a balanced manner through training.

Figure 6A:
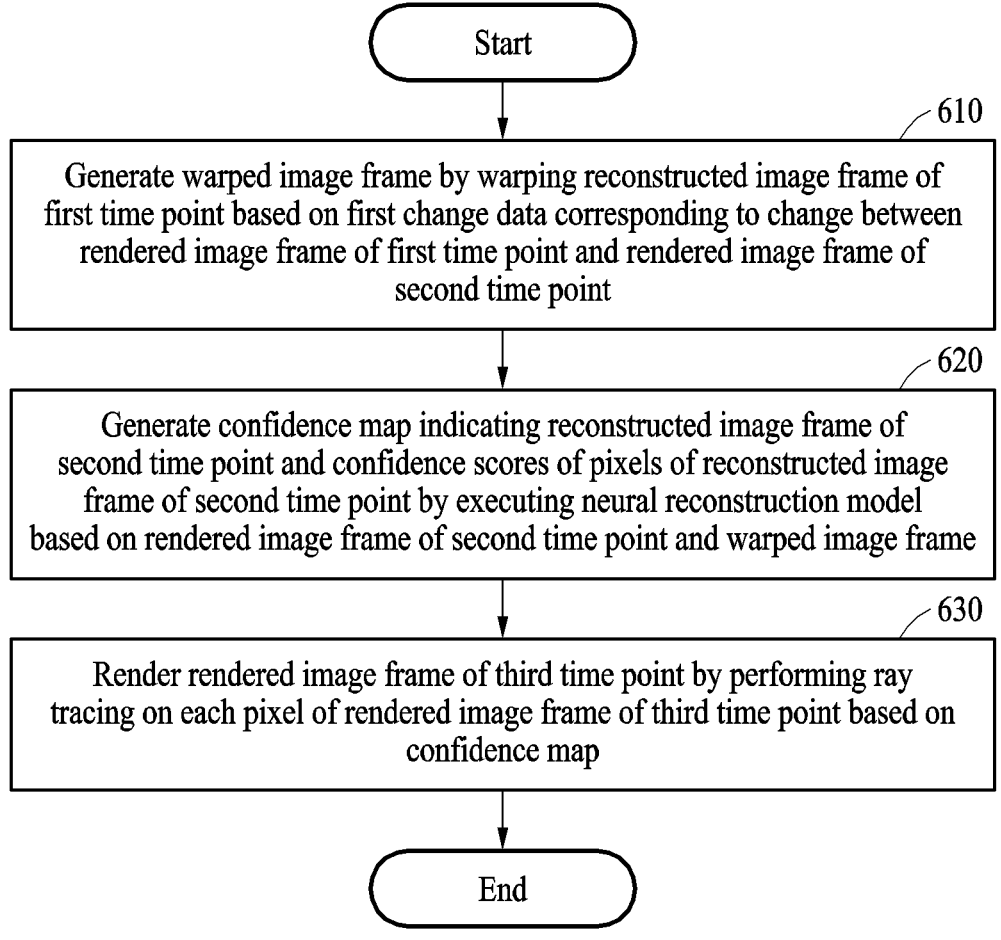
FIGS. 6A and 6B each illustrate an example method with image processing according to one or more embodiments.

FIG. 6A illustrates an example method with image processing according to one or more embodiments. Referring to FIG. 6A, the example method may be a processor-implemented method including operations 610, 620 and 630. These operations may be performed by a computing apparatus (in FIG. 7) or an electronic device (in FIG. 8).

In operation 610, the computing apparatus may generate a warped image frame by warping a reconstructed image frame of a first time point based on first change data representing a change between a rendered image frame of the first time point and a rendered image frame of a second time point. In operation 620, the computing apparatus may generate a confidence map indicating a reconstructed image frame of the second time point and confidence scores of pixels of the reconstructed image frame of the second time point by executing a neural reconstruction model (e.g., the neural reconstruction model 230, 330, or 530) based on the rendered image frame of the second time point and the warped image frame. In operation 630, the computing apparatus may render a rendered image frame of a third time point by performing ray tracing on each pixel of the rendered image frame of the third time point based on the confidence map.

The neural reconstruction model may be configured with a neural auto encoder including a neural encoder and a neural decoder.

In an example, the neural reconstruction model may generate an output image frame that has fewer artifacts and a higher resolution than an input image frame, based on denoising and super sampling with respect to the input image frame.

In an example, the neural reconstruction model may generate the reconstructed image frame of the first time point, based on the rendered image frame of the first time point.

In addition, the descriptions provided with reference to FIGS. 1 through 5. 6B, 7, and 8 may apply to the image processing method of FIG. 6A.

Figure 6B:
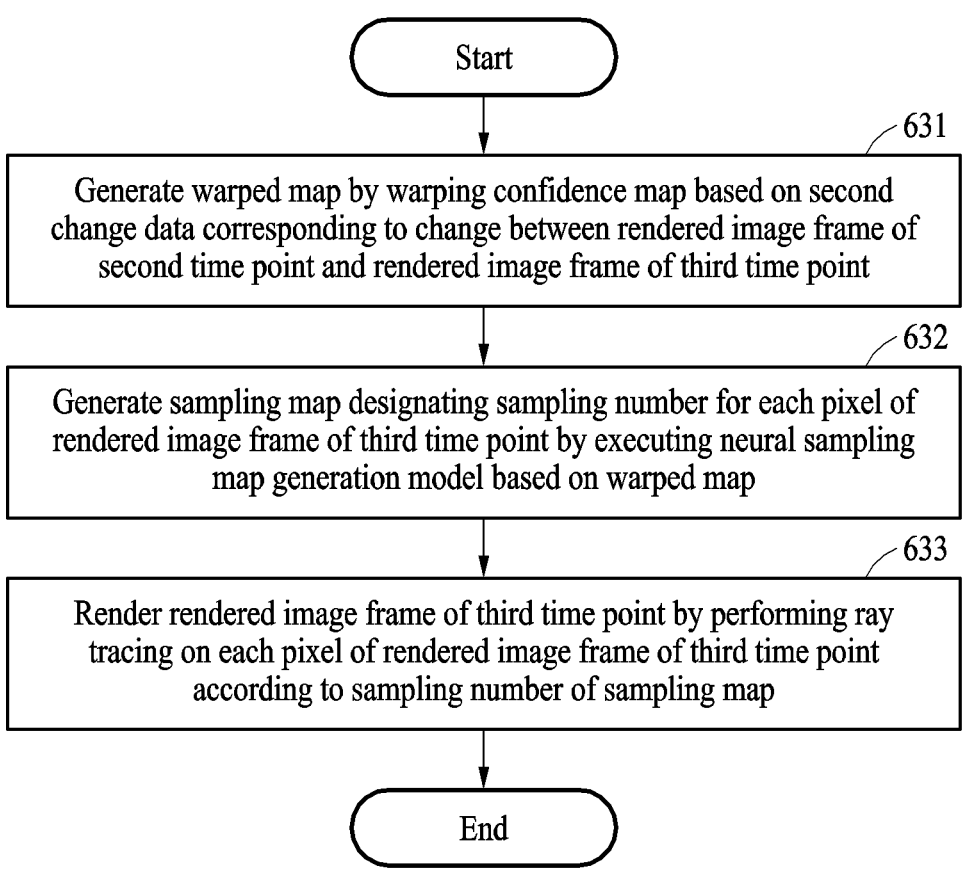

FIG. 6B illustrates an example method with image processing according to one or more embodiments. Referring to FIG. 6B, the example method may be a processor-implemented method including operations 631, 632 and 633. These operations of the example method may be performed by a computing apparatus (in FIG. 7) or an electronic device (in FIG. 8).

In operation 631, the computing apparatus may generate a warped map by warping a confidence map based on second change data representing a change between a rendered image frame of a second time point and a rendered image frame of a third time point. In operation 632, the computing apparatus may generate a sampling map designating a sampling number for each pixel of the rendered image frame of the third time point by executing a neural sampling map generation model (e.g., the neural sampling map generation model 210, 310 or 510) based on the warped map. In operation 633, the computing apparatus may render the rendered image frame of the third time point by performing ray tracing on each pixel of the rendered image frame of the third time point according to the sampling number of the sampling map. In an example, operation 630 of FIG. 6A may include operations 631, 632, and 633.

The warped map may include a confidence score corresponding to each pixel of the rendered image frame of the third time point.

In an example, the neural sampling map generation model may designate the sampling number for each pixel of the rendered image frame of the third time point based on the confidence score of the warped map.

In an example, when a first confidence score of the warped map corresponding to a first pixel of the rendered image frame of the third time point is less than a second confidence score of the warped map corresponding to a second pixel of the rendered image frame of the third time point, the neural sampling map generation model may allocate, to the first pixel, a sampling number that is greater than that of the second pixel.

A maximum value or an average value of the sampling number of each pixel of the rendered image frame of the third time point according to the sampling map may be limited by a preset threshold.

The first change data may include a motion vector of an applicable pixel between the rendered image frame of the first time point and the rendered image frame of the second time point.

In an example, operation 632 may include inputting, to the neural sampling map generation model, additional information corresponding to the rendered image frame of the third time point including at least a part of a depth map, a normal map, and an albedo map.

The descriptions provided with reference to FIGS. 1 through 5, 6A, 7, and/or 8 may apply to the rendering method of FIG. 6B.

Figure 7:
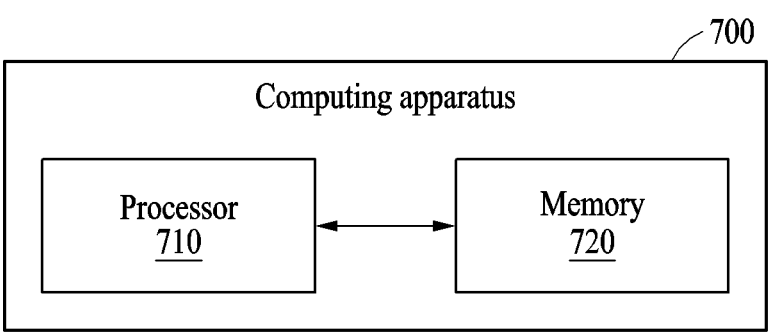
FIG. 7 illustrates an example apparatus with image processing according to one or more embodiments.

FIG. 7 illustrates an example apparatus with image processing according to one or more embodiments. Referring to FIG. 7, the example apparatus may be a computing apparatus 700 that may include a processor 710 and a memory 720. In an example, the computing apparatus 700 may also be the electronic device 800 of FIG. 8. The memory 720 may be connected to the processor 710, and store instructions executable by the processor 710, data to be computed by the processor 710, or data processed by the processor 710. The memory 720 may include a non-transitory computer-readable medium, for example, high-speed random-access memory (RAM), and/or a nonvolatile computer-readable storage medium (e.g., one or more disk storage devices, flash memory devices, or other nonvolatile solid state memory devices).

The processor 710 may be configured to execute the instructions to perform any one or any combination of the operations or methods described herein including those of FIGS. 1 through 6B and 8. For example, the processor 710 may generate a warped image frame by warping a reconstructed image frame of a first time point based on first change data representing a change between a rendered image frame of the first time point and a rendered image frame of a second time point. The processor 710 may generate a confidence map indicating a reconstructed image frame of the second time point and confidence scores of pixels of the reconstructed image frame of the second time point by executing a neural reconstruction model based on the rendered image frame of the second time point and the warped image frame. The processor 710 may render a rendered image frame of a third time point by performing ray tracing on each pixel of the rendered image frame of the third time point based on the confidence map. In addition, the description provided with reference to FIGS. 1 through 6B and 8 may apply to the computing apparatus 700.

Figure 8:
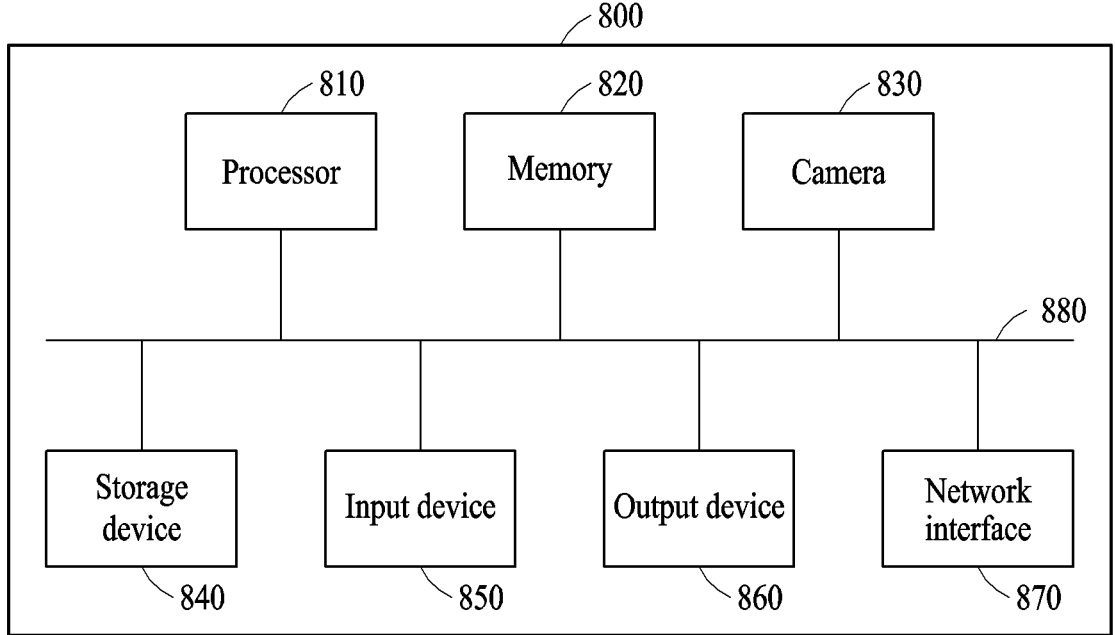
FIG. 8 illustrates an example electronic device according to one or more embodiments.

FIG. 8 illustrates an example electronic device with image processing according to one or more embodiments. Referring to FIG. 8, an electronic device 800 may include a processor 810, a memory 820, a camera 830, a storage device 840, an input device 850, an output device 860, and a network interface 870 that may communicate with each other through a communication bus 880. As non-limiting examples, the electronic device 800 may be implemented as at least a portion of, for example, a mobile device such as a mobile phone, a smartphone, a personal digital assistant (PDA), a netbook, a tablet computer, a laptop computer, and the like; a wearable device such as a smart watch, a smart band, smart glasses, and the like; a home appliance such as a television (TV), a smart TV, a refrigerator, and the like; a security device such as a door lock; a vehicle such as an autonomous vehicle, a smart vehicle, and the like; and a game device such as a console game device, a mobile game device, a Virtual Reality (VR) game device, an Augmented Reality (AR) game device, and the like. The electronic device 800 may structurally and/or functionally include the computing apparatus 700 of FIG. 7.

The processor 810 executes functions and instructions for execution in the electronic device 800. For example, the processor 810 may process instructions stored in the memory 820 or the storage device 840. The processor 810 may perform any one or any combination of the operations or methods described herein including those of FIGS. 1 through 7. The memory 820 may include a computer-readable storage medium or a computer-readable storage device. The memory 820 may store instructions to be executed by the processor 810 and may store related information while software and/or an application is executed by the electronic device 800.

The camera 830 may capture a photo and/or a video of a target object. The storage device 840 includes a computer-readable storage medium or computer-readable storage device. The storage device 840 may store more information than the memory 820 for a long time. For example, the storage device 840 may include a magnetic hard disk, an optical disc, a flash memory, a floppy disk, or other types of non-volatile memory known in the art.

The input device 850 may receive input data from the user in traditional input manners through a keyboard and a mouse and in new input manners such as a touch input, a voice input, and an image input. For example, the input device 850 may include a keyboard, a mouse, a touch screen, a microphone, or any other device that detects the input data from the user and transmits the detected input data to the electronic device 800. The network interface 870 may communicate with an external device through a wired or wireless network.

The output device 860 may display an output image based on reconstructed image frames. The output device 860 may provide an output image of the electronic device 800 to the user through a visual, auditory, or haptic channel. The output device 860 may include, for example, a display, a touch screen, a speaker, a vibration generator, or any other device that provides the output image to the user. For example, the output device 860 may include a display device, a 3D display device, an AR display device, a VR display device, and the like.

The processors, memories, computing apparatuses, electronic devices, models and other apparatuses, devices, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A processor-implemented method comprising:
  generating a warped image frame by warping a first reconstructed image frame of a first time point based on first change data corresponding to a change between first rendered image frame of the first time point and second rendered image frame of a second time point that is different from the first time point;

generating, using a neural reconstruction model based on the second rendered image frame and the warped image frame, a confidence map representing a second reconstructed image frame of the second time point and confidence scores of pixels of the second reconstructed image frame, wherein, in the confidence map, pixels having lower confidence scores are assigned greater sampling numbers than pixels having higher confidence scores; and generating a third rendered image frame of a third time point, different from the first and second time points, by generating a warped map by warping the confidence map based on second change data representing a change between the second rendered image frame and the third rendered image frame, generating a sampling map designating respective sampling numbers for pixels of the third rendered image frame using a neural sampling map generation model based on the warped map, and ray tracing for each of the pixels of the third rendered image frame based on the respective sampling numbers of the sampling map.

2. The method of claim 1, wherein a maximum value or an average value of the respective sampling numbers is limited by a preset threshold.

3. The method of claim 1, wherein the generating of the sampling map using the neural sampling map generation model comprises inputting, to the neural sampling map generation model, additional information corresponding to the third rendered image frame comprising at least a part of a depth map, a normal map, and an albedo map.

4. The method of claim 1, wherein the first change data comprises a motion vector of a corresponding pixel between the first rendered image frame and the second rendered image frame.

5. The method of claim 1, wherein the neural reconstruction model includes a neural auto encoder comprising a neural encoder and a neural decoder.

6. The method of claim 1, wherein the neural reconstruction model determines an output image frame having fewer artifacts and a higher resolution than an image frame, input to the neural reconstruction model, by reconstructing the image frame based on denoising and super sampling with respect to the input image frame.

7. The method of claim 1, wherein the first reconstructed image frame is generated by using the neural reconstruction model based on the first rendered image frame.

8. A non-transitory computer-readable storage medium storing instructions that, when executed by a processor, cause the processor to perform the method of claim 1.

9. A computing apparatus comprising:
a processor configured to execute instructions; and
a memory storing the instructions,
wherein the execution of the instructions by the processor configures the processor to:
generate a warped image frame by warping a first reconstructed image frame of a first time point based on first change data representing a change between first rendered image frame of the first time point and second rendered image frame of a second time point that is different from the first time point;

generate, using a neural reconstruction model based on the second rendered image frame and the warped image frame, a confidence map representing a second reconstructed image frame of the second time point and confidence scores of pixels of the second reconstructed image frame, wherein, in the confidence map, pixels having lower confidence scores are assigned greater sampling numbers than pixels having higher confidence scores; and generate a third rendered image frame of a third time point, different from the first and second time points, by generating a warped map by warping the confidence map based on second change data representing a change between the second rendered image frame and the third rendered image frame, generating a sampling map designating respective sampling numbers for pixels of the third rendered image frame using a neural sampling map generation model based on the warped map, and ray tracing for each the pixels of the third rendered image frame based on the confidence map.

10. The apparatus of claim 9, wherein a maximum value or an average value of the respective sampling numbers is limited by a preset threshold.

11. An electronic device comprising
a processor configured to:
generate a warped image frame by warping a first reconstructed image frame of a first time point based on first change data representing a change between first rendered image frame of the first time point and second rendered image frame of a second time point that is different from the first time point;

generate, using a neural reconstruction model based on the second rendered image frame and the warped image frame, a confidence map representing a second reconstructed image frame of the second time point and confidence scores of pixels of the second reconstructed image frame, wherein, in the confidence map, pixels having lower confidence scores are assigned greater sampling numbers than pixels having higher confidence scores;

generate a warped map by warping the confidence map based on second change data corresponding to a change between the second rendered image frame and a third rendered image frame of a third time point that is different from the first and second time points;

generate, using a neural sampling map generation model based on the warped map, a sampling map designating a respective sampling numbers for pixels of the third rendered image frame; and render the third rendered image frame by performing respective one or more ray tracings on each of the pixels of the third rendered image frame according to the respective sampling numbers of the sampling map.

12. The electronic device of claim 11, further comprising a display configured to display an output image according to the first reconstructed image frame and the second reconstructed image frame.

* * * * *